United States Patent [19]

Madden

[11] 4,331,347
[45] May 25, 1982

[54] THREE-POINT HOOKUP APPARATUS

[76] Inventor: Lem A. Madden, 5530 Blue Lake Dr., Norman, Okla. 73069

[21] Appl. No.: 122,238

[22] Filed: Feb. 19, 1980

[51] Int. Cl.³ .............................................. B60D 1/00
[52] U.S. Cl. ................................ 280/415 A; 172/439; 280/461 A; 280/479 R
[58] Field of Search .......... 280/461 A, 456 A, 460 A, 280/415 A, 479 R, 504, 508; 172/439, 275

[56] References Cited

U.S. PATENT DOCUMENTS

| 731,707 | 6/1903 | Putnam | 280/486 |
| 816,218 | 3/1906 | Clay | 280/510 |
| 2,869,654 | 1/1959 | Hershman | 280/479 R |
| 3,312,478 | 4/1967 | Knaapi | 280/415 A |
| 3,531,140 | 9/1970 | Di Vita et al. | 172/275 |
| 3,716,253 | 2/1973 | Gniffke et al. | 280/415 A |
| 3,792,877 | 2/1974 | Martin | 280/415 A |
| 3,977,698 | 8/1976 | von Allworden | 280/461 A |

Primary Examiner—Joseph F. Peters, Jr.
Assistant Examiner—Donn McGiehan
Attorney, Agent, or Firm—E. Harrison Gilbert, III

[57] ABSTRACT

A coupling apparatus for allowing one person to releasably connect a first object to a second object, which second object has a first engageable portion, a second engageable portion and a third engageable portion, is disclosed. The coupling apparatus includes a first connector mechanism associated with the first object for releasably engaging the first engageable portion of the second object. The coupling apparatus further includes a second connector mechanism associated with the first object for releasably engaging the second engageable portion of the second object. The coupling apparatus further includes a third connector means associated with the first object for releasably engaging the third engageable portion of the second object. Also included in the coupling apparatus is a support member, such as a frame, for interconnecting the first, second and third connector mechanisms. So that the first, second and third connector mechanisms may be operated by a person located in the driver's seat of the vehicle constituting the first object, the coupling apparatus includes a first control arm extending from the first connector mechanism to a position adjacent the driver's seat, a second control arm extending from the second connector mechanism to a second position adjacent the driver's seat, and a third control arm extending from the third connector mechanism to a third position adjacent the driver's seat.

24 Claims, 7 Drawing Figures

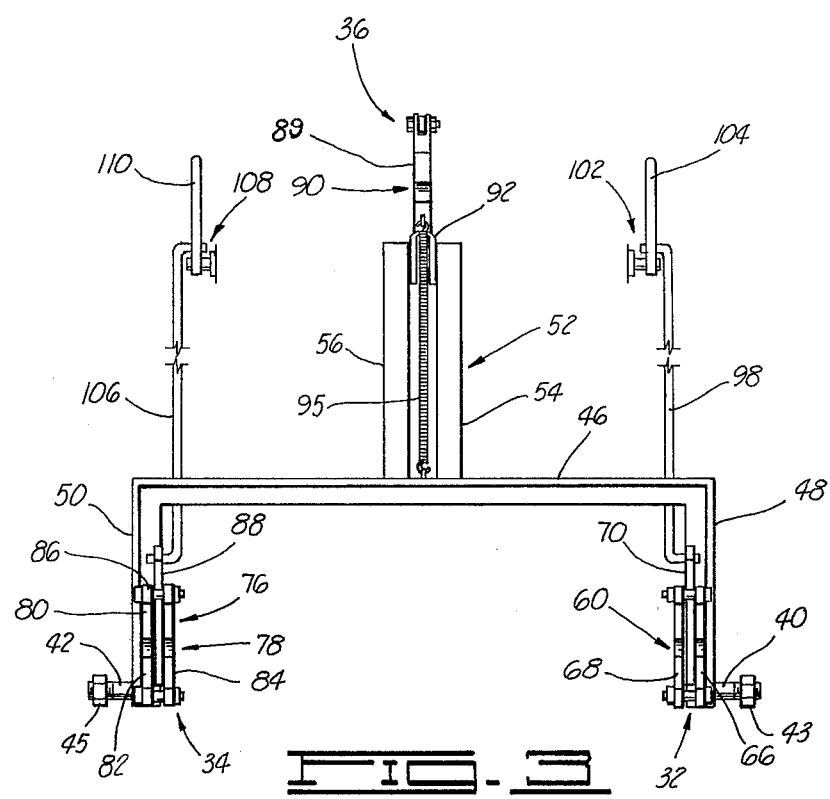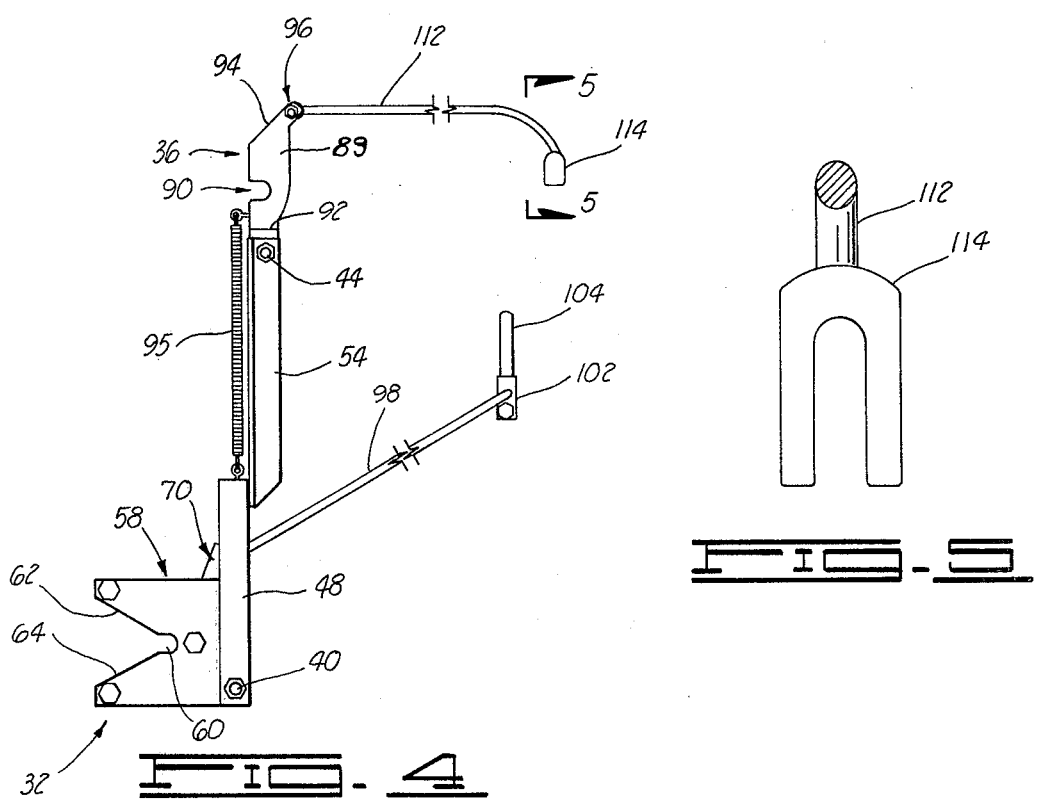

THREE-POINT HOOKUP APPARATUS

BACKGROUND OF THE INVENTION

1. Field of the Invention

This invention relates generally to hookup apparatus for coupling one object to another object and more particularly, but not by way of limitation, to three-point hookup apparatus which are attachable to a three-point system of a tractor so that one person can use the apparatus to attach an implement to the tractor.

2. Description of the Prior Art

Powered vehicles are often used to push or pull working implements to accomplish tasks which would otherwise require strenuous efforts by humans. For example, in plowing a field a tractor is often used to pull a plow so that the ground may be tilled. To so utilize a powered vehicle, such as the tractor, it is necessary to provide some coupling apparatus for connecting the working implement, such as the plow, to the vehicle. To supplement the human labor saving result achieved by using powered vehicles to perform such tasks as plowing, it is necessary to have such coupling apparatus include means which permits one person to connect the working implement to the vehicle. This is necessary to save both human effort in physically connecting the apparatus and also to save the time and effort expended in the logistics of obtaining the necessary number of people to accomplish the hookup.

To enable one person to relatively quickly and easily utilize the coupling apparatus to connect the implement to the vehicle, it is necessary that the coupling apparatus include means which does not need to be precisely aligned with the implement so the vehicle does not need to be maneuvered through multiple movements to effect the hookup. Additionally, so that one person can use the coupling apparatus with a plurality of vehicles, it is desirable that the connector apparatus be portable and releasably connectible with whatever vehicle it is to be used. It is also desirable that the coupling apparatus be compatible for use with a three-point system as is currently found on tractors and the like.

That the need for some type of hookup apparatus is necessary is supported by the apparatus disclosed in U.S. Pat. No. 2,869,654 in the name of Hershman. The Hershman patent discloses a three-point hitch means which is operable from a tractor seat. The connector apparatus shown in the Hershman patent is utilized by backing the tractor to which it is connected until it engages the hitch element of the working implement. Upon engagement with the hitch element, the lower links of a three-point hitch system are raised until engagement recesses are substantially aligned with respective ones of the hitch elements; thereafter, the tractor is pulled forward so that the connector apparatus latches onto the hitch element of the implement. To release the implement, the tractor must be backed a short distance, the links lowered, and then the tractor driven forward so that the implement is freed from the tractor.

Although the Hershman patent discloses a type of connector apparatus for coupling an implement to a vehicle, I do not believe that this patent discloses a connector apparatus which includes means whereby the connection can be affected without having to relatively precisely align the connector apparatus with the hitch element of the implement and without making multiple vehicular movements. Furthermore, I do not believe that the Hershman patent discloses a connector apparatus which is portable or readily interchangeable from one vehicle to another.

SUMMARY OF THE INVENTION

The present invention overcomes the above-noted and other shortcomings of the prior art by providing a novel and improved three-point hookup apparatus. This apparatus permits one person to connect an implement to a vehicle without precisely aligning the apparatus with the implement and without making multiple vehicular movements. Furthermore, the present invention is, in one embodiment, portable and readily interchangeable from one vehicle to another.

Broadly, the present invention is a coupling apparatus for releasably connecting a first object to a second object, which second object has a first engageable portion, a second engageable portion and a third engageable portion. The apparatus comprises a first connector means associated with the first object for releasably engaging the first engageable portion of the second object, a second connector means associated with the first object for releasably engaging the second engageable portion of the second object, and a third connector means associated with the first object for releasably engaging the third engageable portion of the second object.

The first connector means includes a first receiving member having a first notch formed therein to define a first engagement portion adjacent which the first engageable portion of the second object is releasably engaged and further having a first edge and a second edge divergently extending at an acute included angle from the first notch to define a first guide portion. The first connector means further includes a first retaining member movably connected to the first receiving member for movable displacement between the first and second divergently extending edges.

The second connector means includes a second receiving member having a second notch formed therein to define a second engagement portion adjacent which the second engageable portion of the second object is releasably engaged and further having a third edge and a fourth edge divergently extending at an acute included angle from the second notch to define a second guide portion. The second connector means also includes a second retaining member movably connected to the second receiving member for movable displacement between the third and fourth divergently extending edges.

The coupling apparatus further comprises a frame interconnecting the first receiving member, the second receiving member and the third connector means.

The coupling apparatus additionally includes a first operating means for moving the first retaining member, a second operating means for moving the second retaining member, and a third operating means for moving the third connector means.

Therefore, from the foregoing, it is a general object of the present invention to provide a novel and improved threepoint hookup apparatus. Other and further objects, features and advantages of the present invention will be readily apparent to those skilled in the art when the following description of the preferred embodiments is read in conjunction with the accompanying drawings.

BRIEF DESCRIPTION OF THE DRAWINGS

FIG. 3 is a rear elevation view of a portable embodiment of the present invention.

FIG. 4 is a side elevation view of the embodiment shown in FIG. 3.

FIG. 5 is a view taken along section line 5—5 shown in FIG. 4.

DETAILED DESCRIPTION OF PREFERRED EMBODIMENTS OF THE INVENTION

Figure 1:
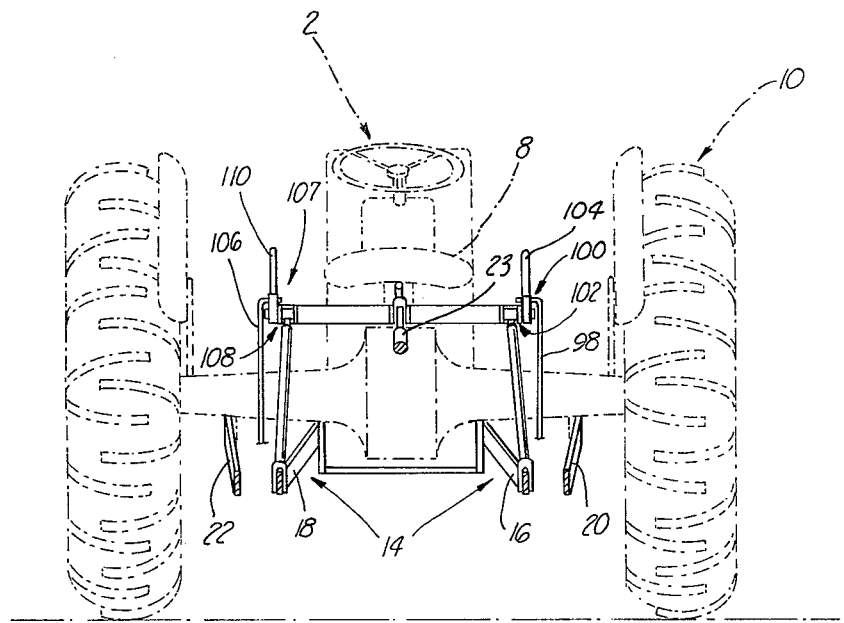
FIG. 1 is a rear elevation view of a tractor and a portion of the present invention connected thereto.
Figure 2:
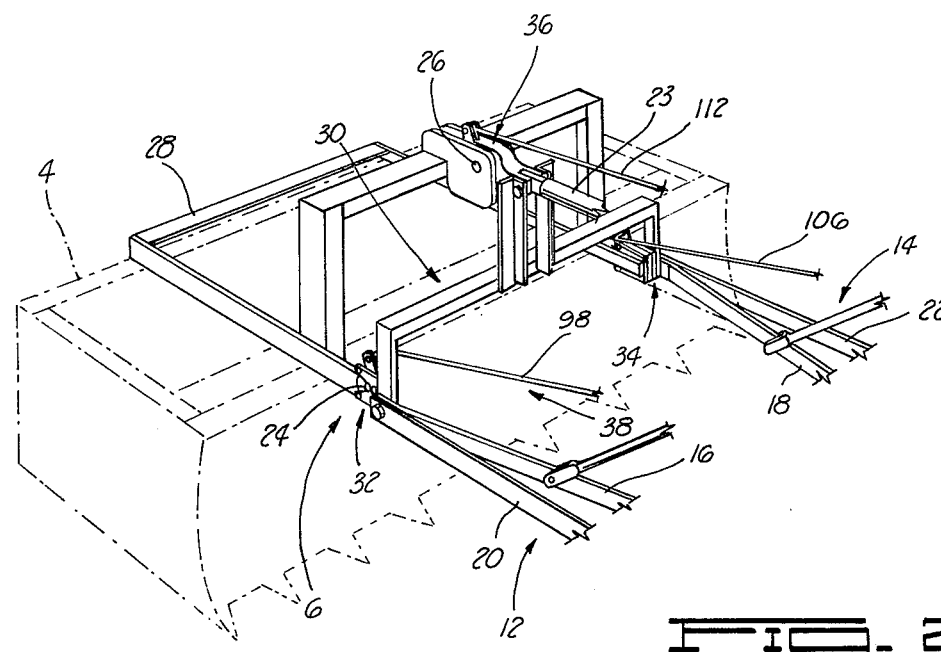
FIG. 2 is a perspective view showing the present invention connected to a portion of the tractor shown in FIG. 1 and engaged with an implement to be moved by the tractor.

With reference to the drawings, a preferred embodiment of the present invention will be described. FIGS. 1 and 2 disclose the rear portion of a vehicle, such as a tractor 2, having an implement 4 connected thereto by means of a coupling apparatus 6 constructed in accordance with the present invention.

The tractor 2 is shown in FIG. 1 to include a vehicle operating position, or driver's or operator's seat, 8 connected to the tractor 2 as is known in the art between a pair of drive wheels 10. Extending to the rear of the driver's seat 8 and between the two wheels 10 is a three-point hitching or attachment system 12 of a type known in the art. In particular the three-point system 12 includes a hydraulically operated yoke 14 having two lift arms 16 and 18 extending rearwardly to define the lower two of the three points of the attachment system. Connected between each lift arm and the frame of the tractor 2 is a respective one of two stabilizer members 20 and 22 for preventing the yoke 14 from excessive lateral movement. The third point of the three-point attachment system is provided by a third lift arm 23. The tractor 2 constitutes a first object to which a second object, the implement 4, is to be connected.

The implement 4 may be a plow or other cultivating tool or any other suitable device which may be connected to the three-point attachment system of the tractor. So that the implement 4 may be coupled to the tractor 2, the implement 4 includes a first engageable portion which is preferably a latchable portion such as a first latch bar or pin 24. The implement also includes a second engageable portion which in the preferred embodiment is a latchable portion such as a second latch bar or pin (not shown). The implement further includes a third engageable portion which likewise is preferably a latchable portion such as a latch bar 26. As shown in FIG. 2 these engageable portions form a part of a coupling structure 28 of the implement 4. Although not shown in the drawings, the second latch bar or pin extends from the coupling structure 28 of the implement 4 depicted in FIG. 2 at a position oppposite the pin 24.

To connect the implement 4 to the tractor 2 in the manner contemplated by the present invention whereby the connection is achieved through the efforts of a single person in a relatively quick and easy manner, the coupling apparatus 6 constructed according to the present invention is associated with the three-point attachment system 12 as shown in FIGS. 1 and 2 of the drawings. This coupling apparatus 6 shown in FIG. 2 is portable and includes a support member 30, a first connector means 32 for releasably engaging the first engageable portion of the second object (i.e., the implement 4), a second connector means 34 for releasably engaging the second engageable portion of the implement, a third connector means 36 for releasably engaging the third engageable portion of the implement, and controlling means 38 for operating the first, second and third connector means from the operator's or driver's seat 8 of the tractor 2. The support member 30 interconnects the three connector means 32, 34 and 36 and the operating means 38 extends from each of the first, second and third connector means to a position within reach of the driver's seat 8 of the vehicle when the support member 30 is connected to the vehicle.

With reference to FIGS. 3 and 4, the portable coupling apparatus 6 constructed in accordance with the present invention will be more particularly described. As shown in FIG. 3, the support member 30 is a frame which interconnects the first, second and third connector means. The support member or frame 30 includes means for removably connecting the support member to the tractor 2. This removable connecting means includes a first lift arm pin 40 and a second lift arm pin 42. Each of the lift arms 16 and 18 has an eyelet end for placing over a respective one of the pins 40 or 42 for connecting the support member to the two points of the three-point attachment system 12 defined by the lift arms 16 and 18. To secure the lift arms 16 and 18 to the pins 40 and 42, respectively, a respective one of the nuts 43 and 45 is threadedly engaged over each of the pins as shown in FIG. 3. The removable connecting means also includes a third pin 44 which is slidably engaged within the support member 30 so that the third arm 23 of the three-point system may be removably connected to the support member 30.

The support member 30 of the preferred embodiment shown in FIGS. 3 and 4 is a rigid frame formed of a substantially horizontally oriented cross member 46 having a first end member 48 extending downwardly from a first end of the cross member 46 and having a second end member 50 extending downwardly from a second end of the cross member 46 and further having a central member 52 extending upwardly from the cross member 46 between the first and second ends thereof. The first connector means 32 is rigidly connected, such as by welding or other suitable means, to the first end member 48, and the second connector means 34 is rigidly connected, such as by welding or other suitable means, to the second end member 50. The third connector means 36 is pivotally connected, by means of the pin 44, to the central member 52. As depicted in FIGS. 3 and 4, the cross member 46, the first and second end members 48 and 50, and the central member 52 may be made of angle irons of a sufficient size to withstand the stresses encountered by the support member 30 in coupling with and dragging or pushing the implement 4. The support member 30 may also be comprised of pipe or tubing having a circular cross section which can be bent or otherwise formed to provide a suitable frame for interconnecting the three connector means.

As shown in FIG. 3, the central member 52 includes a first segment 54 and a second segment 56 connected, such as by welding or other suitable means, to the cross member 46. Extending through both of the inner facing sides of the two angle iron segments 54 and 56 of the central member 52 is a bore through which the third pin 44 of the removable connecting means is slidably positioned. By first removing the pin 44 from the bore of each of the segments 54 and 56 and then inserting the third lift arm 23, which defines the third point of the three-point attachment system 12, between the channel defined by the two segments 54 and 56 and aligning the eyelet of lift arm 23 with the bores, the pin 44 may be replaced to thereby attach the central member 52 of the support member 30 to the third point of the three-point attachment system 12.

As shown in FIGS. 3 and 4, attached to the lower portion of the first end member 48 of the support member 30 is the first connector means 32. In the preferred embodiment, the first connector means 32 is a first latch means. The first connector means includes a first receiving member 58 having a first notch 60 formed therein to define a first engagement portion. FIG. 4 shows that the notch 60 defining the engagement portion of the connector means 32 has a substantially U-shaped, or semicircular, configuration. The first receiving member 58 also has a first edge 62 and a second edge 64 divergently extending at an acute included angle from the first notch 60 to define a first guide portion. As shown in FIG. 4, the divergently extending edges 62 and 64 define a first substantially V-shaped recess which tapers to the first engagement portion adjacent which the first engageable, or latchable portion, of the implement 4 is releasably engaged. The first guide portion defined by the divergently extending edges 62 and 64 is shown to fixedly extend from the first engagement portion so that the guide portion receives the first engageable portion of the implement 4 and guides the first engageable portion into such releasable engagement adjacent the first engagement portion of the connector means 32. In the preferred embodiment shown in the drawings, these elements of the first receiving member 58 are formed in first and second side plates 66 and 68 which are connected by appropriate nuts and bolts as shown in FIGS. 3 and 4. The side plates 66 and 68 may be made of any suitable material which can be joined to the support member 30 and which is sturdy enough to withstand the forces encountered in latching and hauling the implement 4.

Figure 7:
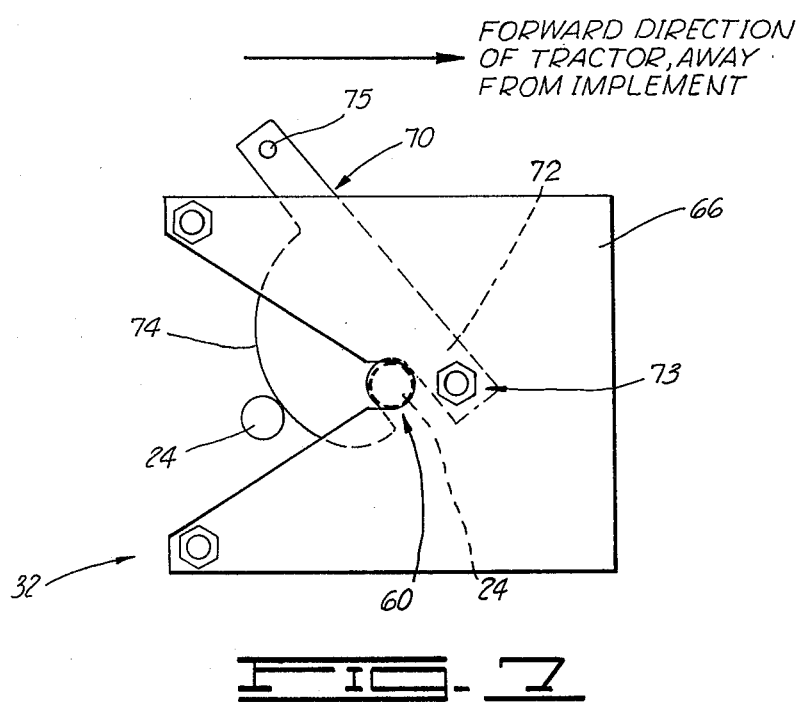
FIG. 7 is a schematic view of the latch means of the present invention associated with a portion of the implement which is to be latched by the latch means.

The first connector means 32 also includes a first retaining means 70 which is movably connected to the first receiving member 58 for movable displacement between the first and second divergently extending edges 62 and 64. More particularly, the first retaining member 70 is movable between a first latchable portion disengaging position and a first latchable portion engaging position. These positions and the operation of the retaining member 70 will be more fully described hereinbelow with reference to the operation of the present invention. As shown in FIG. 4 and more particularly shown in FIG. 7, the retaining member 70 is pivotally connected between the first and second side plates 66 and 68 of the receiving member 58. As depicted in FIG. 7, the preferred embodiment of the retaining member 70 is a substantially h-shaped structure having a straight leg 72 pivotally connected between the plates 66 and 68, such as by the nut and bolt combination 73, and also having a curved leg 74 which has a convex outer edge for engaging the respective latchable portion of the implement 4, such as the pin 24, when the tractor 2 backs toward the implement 4 as hereinbelow described, and which curved leg also has a concave inner edge for retaining the latchable portion of the implement when the retaining member 70 is in its first latchable portion engaging position. As shown in FIG. 7, the end of the straight leg 72 includes a hole 75 for receiving an operating means as subsequently discussed.

The second connector means 34, which is connected to the lower portion of the second end member 50 of the support member 30 as shown in FIGS. 3 and 4, is constructed similarly to the first connector means 32. In particular, the second connector means 34 includes a second receiving member 76 having a second notch 78 formed therein to define a second engagement portion adjacent which the second engageable portion of the implement 4 is releasably engaged and further having a third edge 80 and a fourth edge 82 divergently extending at an acute included angle from the second notch 78 to define a second guide portion which fixedly extends from the second engagement portion for receiving the second engageable portion of the implement and for guiding the second engageable portion into the releasable engagement adjacent the second engagement portion. The second connector means 34 is preferably a second latch means which is associated with a second point of the three-point hitching system 12 of the tractor 2 in spaced relation to the first connector or latch means 32 which is associated with a first point of the three-point hitching system 12. As with the edges 62 and 64 of the first connector means 32, the divergently extending edges 80 and 82 of the second connector means 34 define a substantially V-shaped recess which tapers to the second engagement portion. Likewise, the second connector means includes in the preferred embodiment, third and fourth side plates 84 and 86 joined in spaced relation to each other by means of appropriate nuts and bolts or other suitable connectors.

Disposed between the two spaced apart third and fourth side plates 84 and 86 of the second connector means 34 is a second retaining member 88 movably connected to the second receiving member 76, defined by the plates 84 and 86, for movable displacement between the third and fourth divergently extending edges 80 and 82. Similarly to the first retaining member 70, the second retaining member 88 is movable between a second latchable portion disengaging position and a second latchable portion engaging position. The second retaining member 88 is, in the preferred embodiment, a substantially h-shaped structure pivotally connected between the third and fourth side plates 84 and 86 in like manner to the h-shaped structure of the first retaining member 70 pivotally connected between the first and second side plates 66 and 68.

The third connector means 36 is shown in FIGS. 3 and 4 to be pivotally connected by the third pin 44 between the segments 54 and 56 of the central member 52 in spaced relation to the first and second connector means 32 and 34. As shown in the elevation view of FIG. 3, the third connector means 36 has a substantially Y-shaped configuration having an elongated stem portion 89 in which is disposed a groove or notch 90. The elongated stem portion 89 terminates in a Y-end 92 within which the arm 23 of the three-point hitch is removably connected by the pin 44 to the support member 30 as shown in FIG. 2. The groove is spaced a predetermined distance from the pivotally connected Y-end 92 of the third connector means 36 so that when the first and second connector means 32 and 34 are connected to the respective first and second latchable portions of the implement 4, the third connector means 36 can be pivoted about the third pin 44 to engage the groove 90 in the elongated leg 89 with the third latchable portion of the implement 4. This engagement is depicted in FIG. 2. To retain the third connector means 36 in engagement with the third latchable portion of the implement 4, there is connected between the third connector means 36 and the cross member 46 of the support member 30 a biasing element, such as a spring 95. As shown in FIG. 4, the lower portion of the elongated stem 89 of the Y-shaped third connector means 36 has an appendage 94 in which is formed a hole 96 for receiving an element of the controlling means 38.

The controlling means 38 includes a first operating means for moving the first retaining member 70 of the first connector means 32, a second operating means for moving the second retaining member 88 of the second connector means 34, and a third operating means for controlling the releasable engagement of the third connector means 36.

The first operating means extends from the first retaining member 70 to the vehicle operator's position 8 so that the first operating means is controllable by a person located in the vehicle operator's position. This control permits the operator to move the first retaining member 70 between the first latchable portion disengaging and engaging positions. In particular, the first operating means includes a first control arm 98 which has one end connected to the hole 75 formed in the upper portion of the straight leg 72 of the h-shaped retaining member 70. The control arm 98 extends from the retaining member 70 to a first position 100 adjacent the operator's seat 8. At this first position adjacent the operator's seat, the control arm 98 is movably mounted to the tractor by a first mounting means 102, such as a bracket pivotally connected to the tractor 2. Extending from the mounting means 102 is a lever 104 for moving the control arm so that the retaining member 70 can thereby be actuated and moved from one position to the next.

The second operating means extends from the second retaining member 88 to the vehicle operator's position 8 so that the second operating means is controllable by the person located in the vehicle operator's position. As with the first operating means, the second operating means controllably moves the second retaining member 88 between the second latchable portion disengaging and engaging positions. In the preferred embodiment shown in FIGS. 3 and 4, the second operating means includes a second control arm 106 having one end connected to the hole defined in the upper portion of the substantially h-shaped second retaining member 88 and extending therefrom to a second position 107 adjacent the tractor operator's seat 8. At this second position, the control arm 106 is movably mounted to the tractor 2 by a second mounting means 108 such as a pivotally mounted bracket. The second mounting means has a lever 110 connected thereto whereby the tractor operator may control the movement of the second control arm 106.

The third operating means controls the releasable engagement of the third connector means 36 with the third latchable portion of the implement 4 and extends from the third connector means 36 to the vehicle operator's position 8 so that the third operating means 36 is also controllable by the person located in the vehicle operator's position. In the preferred embodiment the third operating means is a third control arm 112 having one end pivotally connected to the hole 96 formed in the appendage 94 of the substantially Y-shaped third connector means 36 and having a second end movably mounted to a third position adjacent the tractor driver's seat 8 by a third mounting means. As shown in FIGS. 4 and 5, the third mounting means includes a substantially U-shaped clip 114 which can be removably secured to selected positions along the third arm 23 defining the third point of the three-point attachment system 12 of the tractor 2.

Each of the first, second and third control arms 98, 106 and 112 may be a metal rod or other suitable device which can be used to operate the respective components of the connector means.

Figure 6:
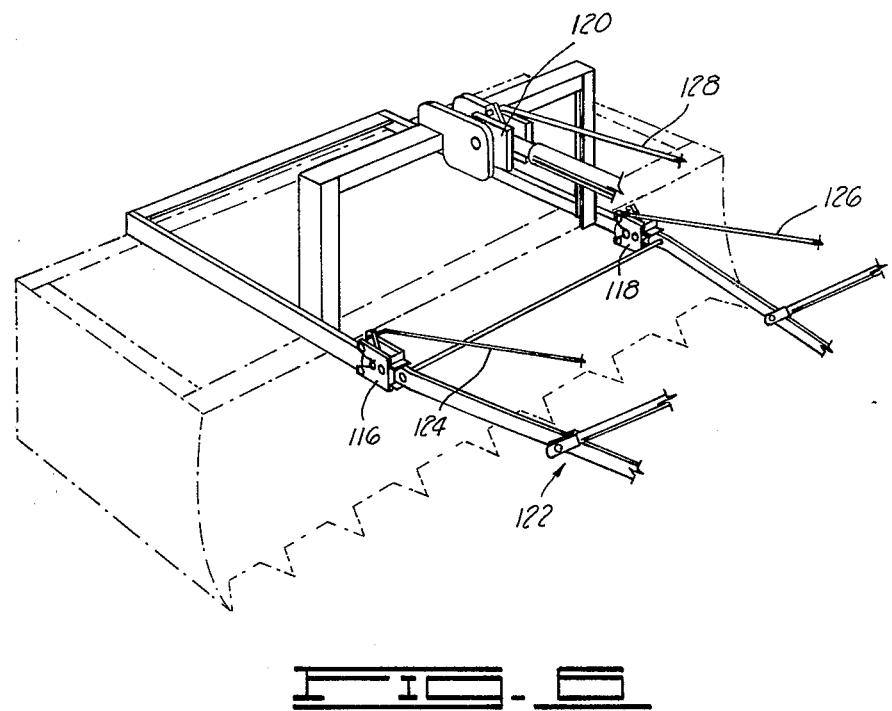
FIG. 6 is a perspective view of a second preferred embodiment of the present invention shown connected to a tractor.

With reference to FIG. 6, a second preferred embodiment of the present invention will be briefly described. The coupling apparatus shown therein includes first, second and third connector means 116, 118 and 120, each being constructed similarly to the first and second connector means 32 and 34 of the first embodiment described with reference to FIGS. 1-5. Each of these connector means is welded, bolted or otherwise suitably connected to a respective one of the members defining the three points of a three-point hitching system 122 of the vehicle with which the hitching system is associated. Extending from each of the connector means shown in FIG. 6 is a suitable operating means, such as rods 124, 126 and 128, similar to those previously discussed with respect to the first, second and third connector means 32, 34 and 36 of the first preferred embodiment described hereinabove.

With reference to all the drawings in general, the operation of the present invention will be described. Initially, the support member 30 of the embodiment shown in FIGS. 1-5 or the connector means 116, 118 and 120 of the embodiment shown in FIG. 6 are associated with the respective points of the three-point attachment system of the vehicle. For example, the lift arms 16 and 18 may be releasably secured, by means of the nuts 43 and 45, to the first and second lift arm pins 40 and 42 of the support member 30 and the lift arm 23 may be connected to the central member 52 of the support member 30 by removing the third pin 44, inserting the eyelet end of the arm 23 into the channel defined by the segments 54 and 56 of the central member 52, and then reinserting the pin 44 through the holes of the segments 54 and 56 to retain the arm 23 therebetween.

Next, the control arms 98, 106 and 112 of the controlling means 38 are each connected to their respective connector means and to their respective positions on the vehicle within reach of the operator positioned in the driver's position of the vehicle.

With the coupling apparatus of the present invention so associated with the tractor 2, the tractor 2 is backed to a position sufficiently close to the first and second engageable portions of the implement 4 (such as the pin 24 and the oppositely disposed pin of the second engageable portion) so that the lift arms 16 and 18 may be hydraulically moved by the hydraulic system of the tractor 2 to bring the open ends of the V-shaped grooves defined by the edges 62, 64, 80 and 82 of the first and second connector means 32 and 34, respectively, into approximate alignment with the first and second engageable portions of the implement 4. It is to be noted that because of these divergently extending edges of the first and second connector means 32 and 34, this alignment does not have to be precise because these edges define the first and second guide means which force the engageable portions of the implement 4 to move to the proper position adjacent the respective engagement portions of the first and second connector means 32 and 34.

With the first and second connector means 32 and 34 approximately aligned, the tractor 2 is backed farther until the first and second engageable portions of the implement 4 contact the respective convex edges of the respective retaining members 70 and 88 of the first and second connector means 32 and 34. As illustrated in FIG. 7, as the tractor is backed toward the implement, each engageable portion, such as the pin 24 shown in FIG. 7, is forced against the convex edge of the curved leg of the retaining member, such as the curved leg 74 shown in FIG. 7, so that the retaining member pivots upward to the latchable portion disengaging position to allow the engageable portion, such as the pin 24, to enter the engagement portion, such as the notch 60, of the connector means. In the FIG. 7 illustration, this force causes the retaining member 70 to pivot clockwise until the pin 24 of the implement 4 slides past the lower edge of the curved leg 74 of the h-shaped structure into the notch 60 of the connector means 32. Once the pin 24 is seated adjacent the engagement portion defined by the notch 60, as indicated by the FIG. 7 phantom line depiction of pin 24, the retaining member 70 drops downward, or pivots in a counterclockwise direction, into its engageable portion engaging position as shown in FIG. 7. It is apparent from FIG. 7 that when the pin 24 is so engaged, it will not become disengaged when the tractor is moved in either a forward or backward direction. It is also apparent that this operation of coupling the first connector means to the first engageable portion of the implement and the similar coupling of the second connector means to the second engageable portion of the implement is achieved by a single directional movement of the tractor.

With the first and second connector means 32 and 34 latched to the first and second engageable portions of the implement 4, the third connector means 36 is then pivoted about the third pin 44 so that the groove, or notch, 90 formed in the third connector means engages the third engageable portion, such as the latch bar 26, of the implement 4. With the coupling of this third point, the implement 4 has been relatively quickly and easily coupled to the tractor 2 by only one person, the operator of the tractor.

To decouple the implement from the tractor, the operator disconnects the third connector means 36 from the third engageable portion of the implement by unclipping the clip means 114 and pivoting the substantially Y-shaped structure upward. The structure is held in its up position by clipping the clip 114 at an appropriate place on the third lift arm 23. The vehicle operator also moves the two levers 104 and 110 to their positions whereby the respective retaining members 70 and 88 connected to the control rods 98 and 106, respectively, associated with the levers are moved to their engageable portion disengaging positions. For example, the retaining member 70 as shown in FIG. 7 is pivoted clockwise so that the phantom-lined pin 24 held in engagement adjacent the notch 60 will separate therefrom when the tractor is moved in a forward direction away from the implement.

Finally, the operator moves the tractor in a single second direction so that the first connector means separates from the first engageable portion of the implement and the second connector means separates from the second engageable portion of the implement. That is, with the connector means all disengaged from the respective engageable portions of the implement, the operator moves the tractor forward to effect the complete separation. Therefore, as with the coupling operation, the decoupling operation has been accomplished relatively quickly and easily by only one person.

Thus, the present invention for a coupling apparatus used with a three-point attachment system of a vehicle is well adapted to carry out the objects and attain the ends and advantages mentioned above as well as those inherent therein. While preferred embodiments of the invention have been described for the purpose of this disclosure, numerous changes in the construction and arrangement of parts can be made by those skilled in the art, which changes are encompassed within the spirit of this invention as defined by the appended claims.

What is claimed is:

1. An apparatus for allowing a person to connect an implement having first, second and third engageable portions to a tractor having an operator's seat in which the person is located and further having a three-point attachment system, said apparatus comprising:
   a rigid frame having means for removably connecting said frame to each of the three points of the three-point attachment system;
   a first latch means attached to said frame and associated with the first point of the three-point system;
   a second latch means attached to said frame and associated with the second point of the three-point system;
   a connector means attached to said frame and associated with the third point of the three-point system;
   a first control rod extending from said first latch means to a first position adjacent the operator's seat;
   a first mounting means for movably mounting said first control rod to the tractor at said first position;
   a second control rod extending from said second latch means to a second position adjacent the operator's seat;
   a second mounting means for movably mounting said second control rod to the tractor at said second position;
   a third control rod extending from said connector means to a third position adjacent the driver's seat; and
   a third mounting means for movably mounting said third control rod to the tractor at said third position.

2. A method of coupling an implement having a first engageable portion, a second engageable portion and a third engageable portion to a vehicle having a three-point attachment system, comprising the steps of:
   associating each of a first connector means, a second connector means, and a third connector means with a respective one of the points of the three-point attachment system;
   connecting operating means to said first, second and third connector means and to the vehicle so that said operating means is controllable from a driver's position on the vehicle;
   adjusting the three-point attachment system to approximately align said first connector means with the first engageable portion of the implement and to approximately align said second connector means with the second engageable portion of the implement;
   moving the vehicle, said first connector means, and said second connector means in a single first direction so that said first connector means engages and retains the first engageable portion of the implement adjacent said first connector means and said second connector means engages and retains the second engageable portion of the implement adjacent said second connector means; and connecting said third connector means to the third engageable portion of the implement.

3. A method as defined in claim 2, further comprising, for decoupling the implement from the vehicle, the steps of:

disconnecting said third connector means from the third engageable portion of the implement;

actuating said operating means; and moving the vehicle, said first connector means, and said second connector means in a single second direction so that said first connector means separates from the first engageable portion of the implement and said second connector means separates from the second engageable portion of the implement.

4. An apparatus for permitting one person to connect an implement having a first latchable portion, a second latchable portion, and a third latchable portion to a vehicle having a vehicle operator's position and a three-point hitching system, said apparatus comprising:

first latch means, associated with a first point of the three-point hitching system of the vehicle, for releasably engaging the first latchable portion of the implement, said first latch means including:

a first receiving member having a first substantially V-shaped recess formed in a side thereof, said first recess tapering to a first engagement portion adjacent which the first latchable portion is releasably engaged and said first receiving member including a first side plate and a second side plate; and a first retaining member movably connected to said first receiving member so that said first retaining member is movable between a first latchable portion disengaging position and a first latchable portion engaging position, said first retaining member including a first substantially h-shaped structure having a straight leg pivotally connected between said first and second side plates and also having a curved leg with a convex outer edge for engaging the first latchable portion and with a concave inner edge for retaining the first latchable portion when said first retaining member is in the first latchable portion engaging position;

second latch means, associated with a second point of the three-point hitching system of the vehicle in spaced relation to said first latch means, for releasably engaging the second latchable portion of the implement, said second latch means including:

a second receiving member having a second substantially V-shaped recess formed in a side thereof, said second recess tapering to a second engagement portion adjacent which the second latchable portion is releasably engaged and said second receiving member including a third side plate and a fourth side plate; and a second retaining member movably connected to said second receiving member so that said second retaining member is movable between a second latchable portion disengaging position and a second latchable portion engaging position, said second retaining member including a second substantially h-shaped structure having a straight leg pivotally connected between said third and fourth side plates and also having a curved leg with a convex outer edge for engaging the first latchable portion and with a concave inner edge for retaining the second latchable portion when said second retaining member is in the second latchable portion engaging position; and connector means, associated with a third point of the three-point hitching system of the vehicle in spaced relation to said first and second latch means, for releasably engaging the third latchable portion of the implement.

5. An apparatus as defined in claim 4, wherein said connector means includes an elongated leg member having a groove disposed therein so that when said first and second latch means engage the first and second latchable portions, respectively, said groove can engage the third latchable portion.

6. An apparatus as defined in claim 5, further comprising: a first operating means for moving said first retaining member between said first latchable portion disengaging and engaging positions, said first operating means extending from said first retaining member to the vehicle operator's position so that said first operating means is controllable by a person located in the vehicle operator's position;

a second operating means for moving said second retaining member between said second latchable portion disengaging and engaging positions, said second operating means extending from said second retaining member to the vehicle operator's position so that said second operating means is controllable by the person located in the vehicle operator's position; and a third operating means for controlling the releasable engagement of said connector means with the third latchable portion of the implement, said third operating means extending from said connector means to the vehicle operator's position so that said third operating means is controllable by the person located in the vehicle operator's position.

7. An apparatus as defined in claim 6, wherein said third operating means includes:

a control arm pivotally connected at one end to said connector means; and a substantially U-shaped clip extending from the other end of said control arm for being removably secured to selected positions of the third point of the three-point hitching system.

8. An apparatus as defined in claim 4, further comprising a support member having said first latch means and said second latch means connected to respective portions thereof and further having said connector means pivotally connected thereto in spaced relation to said first and second latch means.

9. An apparatus as defined in claim 8, further comprising biasing means, connected between said support member and said connector means, for retaining said connector means in engagement with the third latchable portion.

10. An apparatus as defined in claim 7, wherein said connector means includes an elongated leg member having a groove disposed therein so that when said first and second latch means engage the first and second latchable portions, respectively, said groove can engage the third latchable portion.

11. An apparatus as defined in claim 9, further comprising:
a first operating means for moving said first retaining member between said first latchable portion disengaging and engaging positions, said first operating means extending from said first retaining member to the vehicle operator's position so that said first operating means is controllable by a person located in the vehicle operator's position;
a second operating means for moving said second retaining member between said second latchable portion disengaging and engaging positions, said second operating means extending from said second retaining member to the vehicle operator's position so that said second operating means is controllable by the person located in the vehicle operator's position; and
a third operating means for controlling the releasable engagement of said connector means with the third latchable portion of the implement, said third operating means extending from said connector means to the vehicle operator's position so that said third operating means is controllable by the person located in the vehicle operator's position.

12. An apparatus as defined in claim 11, wherein said connector means includes an elongated leg member having a groove disposed therein so that when said first and second latch means engage the first and second latchable portions, respectively, said groove can engage the third latchable portion.

13. An apparatus as defined in claim 12, wherein said third operating means includes:
a control arm pivotally connected at one end to said connector means; and
a substantially U-shaped clip extending from the other end of said control arm for being removably secured to selected positions of the third point of the three-point hitching system.

14. A coupling apparatus for releasably connecting a first object having an operator's position to a second object having a first engageable portion, a second engageable portion and a third engageable portion, comprising:
first connector means, associated with the first object, for releasably engaging the first engageable portion of the second object, said first connector means including:
a first engagement portion adjacent which the first engageable portion is releasably engaged; and
a first guide portion, fixedly extending from said first engagement portion, for receiving the first engageable portion and guiding the first engageable portion into said releasable engagement adjacent said first engagement portion;
second connector means, associated with the first object, for releasably engaging the second engageable portion of the second object, said second connector means including:
a second engagement portion adjacent which the second engageable portion is releasably engaged; and
a second guide portion, fixedly extending from said second engagement portion, for receiving the second engageable portion and guiding the second engageable portion into said releasable engagement adjacent said second engagement portion; and
third connector means, associated with the first object, for releasably engaging the third engageable portion of the second object, said third connector means including a substantially Y-shaped member having an elongated leg terminating at a Y-end, said elongated leg having a groove disposed therein so that when said first and second connector means engage the first and second engageable portions of the second object, respectively, said groove can engage the third engageable portion.

15. An apparatus as defined in claim 14, further comprising:
a first operating means for operating said first connector means from the operator's position so that said first operating means is controllable by a person located in the operator's position;
a second operating means for operating said second connector means from the operator's position so that said second operating means is controllable by the person located in the operator's position; and
a third operating means for operating said third connector means from the operator's position so that said third operating means is controllable by the person located in the operator's position.

16. An apparatus as defined in claim 15, wherein said third operating means includes:
a control arm pivotally connected at one end to said elongated leg of said third connector means; and
a substantially U-shaped clip extending from the other end of said control arm for being removably secured to selected positions of the first object.

17. An apparatus as defined in claim 14, further comprising a support member having said first connector means and said second connector means connected to respective portions thereof and having said Y-end of said third connector means pivotally connected thereto in spaced relation to said first and second connector means.

18. An apparatus as defined in claim 17, further comprising biasing means, connected between said support member and said third connector means, for retaining said third connector means in engagement with the third engageable portion.

19. An apparatus as defined in claim 17, further comprising:
a first operating means for operating said first connector means from the operator's position so that said first operating means is controllable by a person located in the operator's position;
a second operating means for operating said second connector means from the operator's position so that said second operating means is controllable by the person located in the operator's position; and
a third operating means for operating said third connector means from the operator's position so that said third operating means is controllable by the person located in the operator's position.

20. An apparatus as defined in claim 19, wherein said third operating means includes:
a control arm pivotally connected at one end to said elongated leg of said third connector means; and
a substantially U-shaped clip extending from the other end of said control arm for being removably secured to selected positions of the first object.

21. An apparatus as defined in claim 20, further comprising biasing means, connected between said support member and said third connector means, for retaining said third connector means in engagement with the third engageable portion.

22. An apparatus as defined in claim 21, wherein the first object includes a vehicle having a three-point hitching system comprising as one of the three points an arm member having an end removably connectible to said support member within said Y-end of said third connector means.

23. An apparatus as defined in claim 19, further comprising biasing means, connected between said support member and said third connector means, for retaining said third connector means in engagement with the third engageable portion.

24. An apparatus as defined in claim 23, wherein the first object includes a vehicle having a three-point hitching system comprising as one of the three points an arm member having an end removably connectible to said support member within said Y-end of said third connector means.

* * * * *